(12) United States Patent
Peters et al.

(10) Patent No.: US 9,709,006 B2
(45) Date of Patent: Jul. 18, 2017

(54) SYSTEMS AND METHODS FOR DEPRESSURIZING A FUEL TANK

(71) Applicant: Ford Global Technologies, LLC, Dearborn, MI (US)

(72) Inventors: Mark W. Peters, Wolverine Lake, MI (US); Bryan Michael Bolger, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 14/681,831

(22) Filed: Apr. 8, 2015

(65) Prior Publication Data

US 2016/0298579 A1 Oct. 13, 2016

(51) Int. Cl.
| | | |
|---|---|---|
| *F02M 25/08* | (2006.01) | |
| *F16K 31/02* | (2006.01) | |
| *B60K 6/20* | (2007.10) | |
| *B60K 15/035* | (2006.01) | |
| *B60K 15/03* | (2006.01) | |

(52) U.S. Cl.
CPC ......... *F02M 25/0836* (2013.01); *B60K 6/20* (2013.01); *B60K 15/03519* (2013.01); *F02M 25/08* (2013.01); *F02M 25/0854* (2013.01); *F16K 31/02* (2013.01); *B60K 2015/0319* (2013.01); *B60K 2015/0358* (2013.01); *B60K 2015/0359* (2013.01); *B60K 2015/03217* (2013.01); *B60K 2015/03561* (2013.01); *B60Y 2400/302* (2013.01); *B60Y 2400/306* (2013.01); *B60Y 2400/3019* (2013.01)

(58) Field of Classification Search
CPC .............. F02M 26/08; F02M 26/0818; F02M 26/0836; F02M 26/0872; B60K 15/03519; B60K 2015/03561
USPC ......................................... 123/516, 518–520
See application file for complete search history.

(56) References Cited

U.S. PATENT DOCUMENTS

| | | |
|---|---|---|
| 3,762,442 A | 10/1973 | Paul |
| 5,052,655 A | 10/1991 | Ackroyd |
| 7,347,221 B2 | 3/2008 | Berger et al. |
| 8,228,149 B2 | 7/2012 | Puth et al. |
| 8,539,978 B2 | 9/2013 | Santinanavat et al. |

(Continued)

OTHER PUBLICATIONS

Ognjanovski, R. et al., "Systems and Methods for a Latchable Refueling Valve," U.S. Appl. No. 14/830,175, filed Aug. 19, 2015, 59 pages.

*Primary Examiner* — Mahmoud Gimie
(74) *Attorney, Agent, or Firm* — James Dottavio; McCoy Russell LLP

(57) ABSTRACT

Methods and systems are provided for depressurizing a fuel tank prior to refueling the fuel tank. One example method includes adjusting a latchable refueling valve to a latched open position to enable vapor flow from the fuel tank to a vapor canister at a first rate, and responsive to fuel tank pressure being higher than a first pressure threshold after a pre-determined duration at the latched open position, modifying the latchable refueling valve to an unlatched open position. The unlatched open position of the latchable refueling valve enables a second flow rate for fuel vapors, the second flow rate higher than the first flow rate at the latched open position.

20 Claims, 8 Drawing Sheets

(56) References Cited

U.S. PATENT DOCUMENTS

| | | | |
|---|---|---|---|
| 2001/0010219 A1* | 8/2001 | Isobe | F02M 25/08 |
| | | | 123/516 |
| 2005/0046531 A1 | 3/2005 | Moyer et al. | |
| 2014/0026866 A1 | 1/2014 | Pifher et al. | |
| 2015/0101689 A1* | 4/2015 | Balsdon | F02M 25/0818 |
| | | | 137/551 |
| 2015/0122229 A1 | 5/2015 | Dudar et al. | |
| 2015/0316007 A1* | 11/2015 | Williams | F02M 25/0872 |
| | | | 137/583 |

* cited by examiner

SYSTEMS AND METHODS FOR DEPRESSURIZING A FUEL TANK

TECHNICAL FIELD

The field of the invention is related to fuel tank depressurization prior to fuel tank refilling of motor vehicles, and hybrid vehicles in particular.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation in a hybrid vehicle, the evaporative emission control system allows the vapors to be purged into the engine intake manifold for use as fuel.

The fuel vapor canister in the hybrid vehicle may primarily store refueling vapors. Further, vapors from running loss and diurnal temperature cycles may not be transferred into the fuel vapor canister and may be contained within the fuel tank. Accordingly, pressure may build in the fuel tank and a higher pressure may exist within the fuel tank. When a vehicle operator indicates a demand to refuel the hybrid vehicle, the fuel cap may be locked until venting of the fuel tank is allowed to sufficiently reduce tank pressure. As such, the fuel cap may be unlocked only after the tank pressure is below a threshold pressure protecting the vehicle operator from being sprayed with fuel vapor.

Previously disclosed systems include a single fuel tank isolation valve (FTIV) between the fuel tank and the fuel vapor canister. The FTIV may be a solenoid valve that is normally closed but the FTIV may be opened to prepare the fuel tank for refueling. However, a constant voltage supply may be provided to energize the FTIV to open and enable depressurization of the fuel tank. As such, the constant supply of voltage to the FTIV may increase power consumption and lead to a rise in maintenance costs. Accordingly, the FTIV may be replaced with a latchable refueling valve. The latchable refueling valve may reduce power consumption but may not provide a sufficient depressurization rate during certain conditions. For example, in hot weather conditions, the fuel tank may be at a higher pressure and depressurization via the latchable refueling valve may take a longer time. Specifically, the vehicle operator may have to wait for a longer time until the fuel tank is ready for refueling.

The inventors herein have recognized the above issues, and have identified an approach to at least partly address the issues. In one example approach, a method comprises adjusting a latchable valve to a first, latched position via a voltage pulse, the first, latched position enabling a depressurization of a fuel tank, and responsive to a pressure in the fuel tank higher than a first pressure threshold after a pre-determined duration, moving the latchable valve to a second, unlatched position with a more continuously applied voltage, the second, unlatched position more open than the first latched position. In this way, the fuel tank may be depressurized at a faster rate.

In another example, a system for a hybrid-electric vehicle comprises an engine, a fuel tank coupled to a fuel vapor canister via each of a first conduit and a second conduit, a tank pressure control valve coupled in the first conduit between the fuel tank and the fuel vapor canister, a latchable refueling valve coupled in the second conduit between the fuel tank and the fuel vapor canister, the latchable refueling valve including a latch and a latch guide, and a controller configured with instructions stored in non-transitory memory and executable by a processor for, in response to a refueling request, opening the tank pressure control valve while maintaining the latchable refueling valve closed at a latched, closed position, and when fuel tank pressure is lower than a first pressure threshold, actuating the latchable refueling valve with a voltage pulse to a latched open position to transfer fuel vapors into the fuel vapor canister, and if fuel tank pressure is higher than a second pressure threshold after a pre-determined duration, actuating the latchable refueling valve to an unlatched open position with a more continuously applied voltage, for example more continuously applied than an intermittent pulse to move the valve to a different position. In one example, the more continuously applied voltage may be a continuous voltage maintained at a maximum voltage level continuously over a duration that is longer than a maximum duration used to move the valve from one position to another. In this way, higher tank pressures can be released prior to fuel tank refueling in a faster and safer manner.

For example, a hybrid vehicle may include a fuel tank coupled to a fuel vapor canister via a first conduit and a second conduit. A tank pressure control valve may be coupled within the first conduit while a latchable refueling valve may be coupled within the second conduit. The tank pressure control valve and the latchable refueling valve may be normally closed such that fluidic communication between the fuel tank and the fuel vapor canister is impeded. Upon a refuel request by a vehicle operator, the tank pressure control valve may be opened first, while maintaining the latchable refueling valve in its latched closed position. After tank pressure falls below a first pressure threshold, the latchable refueling valve may then be adjusted from the latched closed position to a latched open position via a pulse of voltage. The latched open position of the latchable refueling valve may enable fluidic communication between the fuel tank and the fuel vapor canister. Further, fuel vapors from the fuel tank may be transferred to the fuel vapor canister via the latchable refueling valve at a first flow rate. After a pre-determined duration at the latched open position, if fuel tank pressure remains higher than a second pressure threshold, the latchable refueling valve may be adjusted to an unlatched open position. As such, the latchable refueling valve may receive a continuous supply of voltage when in the unlatched open position. Further, the unlatched open position of the latchable refueling valve may enable a higher flow rate of the fuel vapors from the fuel tank to the fuel vapor canister.

In this way, a technical effect of a faster depressurization rate of the fuel tank may be achieved. The unlatched open position of the latchable refueling valve may provide a more open position of the latchable refueling valve allowing an expedited release of fuel vapors from the fuel tank into the fuel vapor canister. Further, since the latchable refueling valve is adjusted to the unlatched open position only after the pre-determined duration, the latchable refueling valve may not receive continuous voltage through the entire duration of depressurization of the fuel tank. Accordingly, power consumption may be reduced and cost savings may be attained. As such, a balance between reduced power consumption and a faster depressurization may be obtained. Overall, waiting time for initiating refueling may be reduced while ensuring the vehicle operator is protected from fuel vapor spray.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

Figure 4:
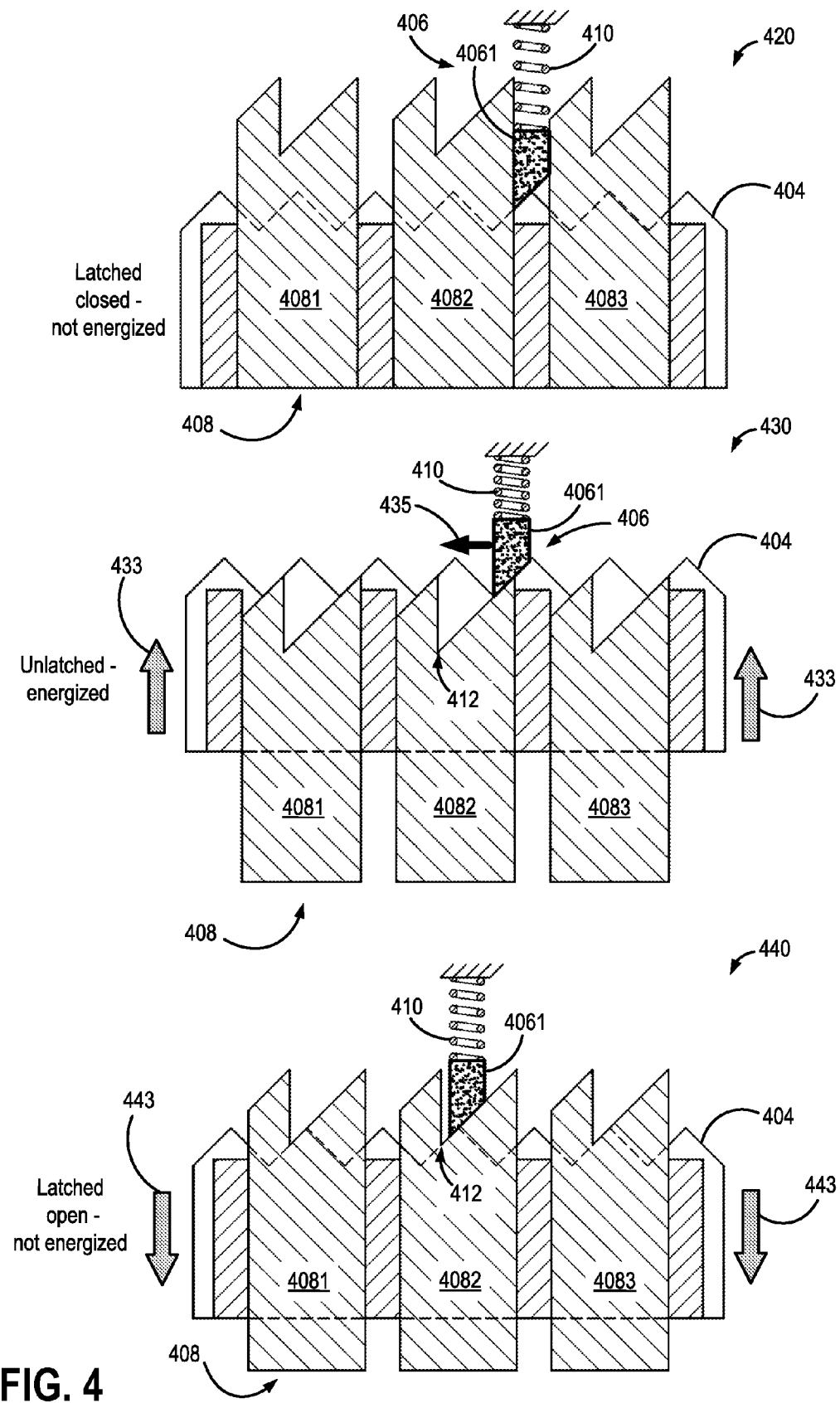

FIG. 4 schematically shows adjusting the latchable refueling valve to a latched open position.

Figure 5:
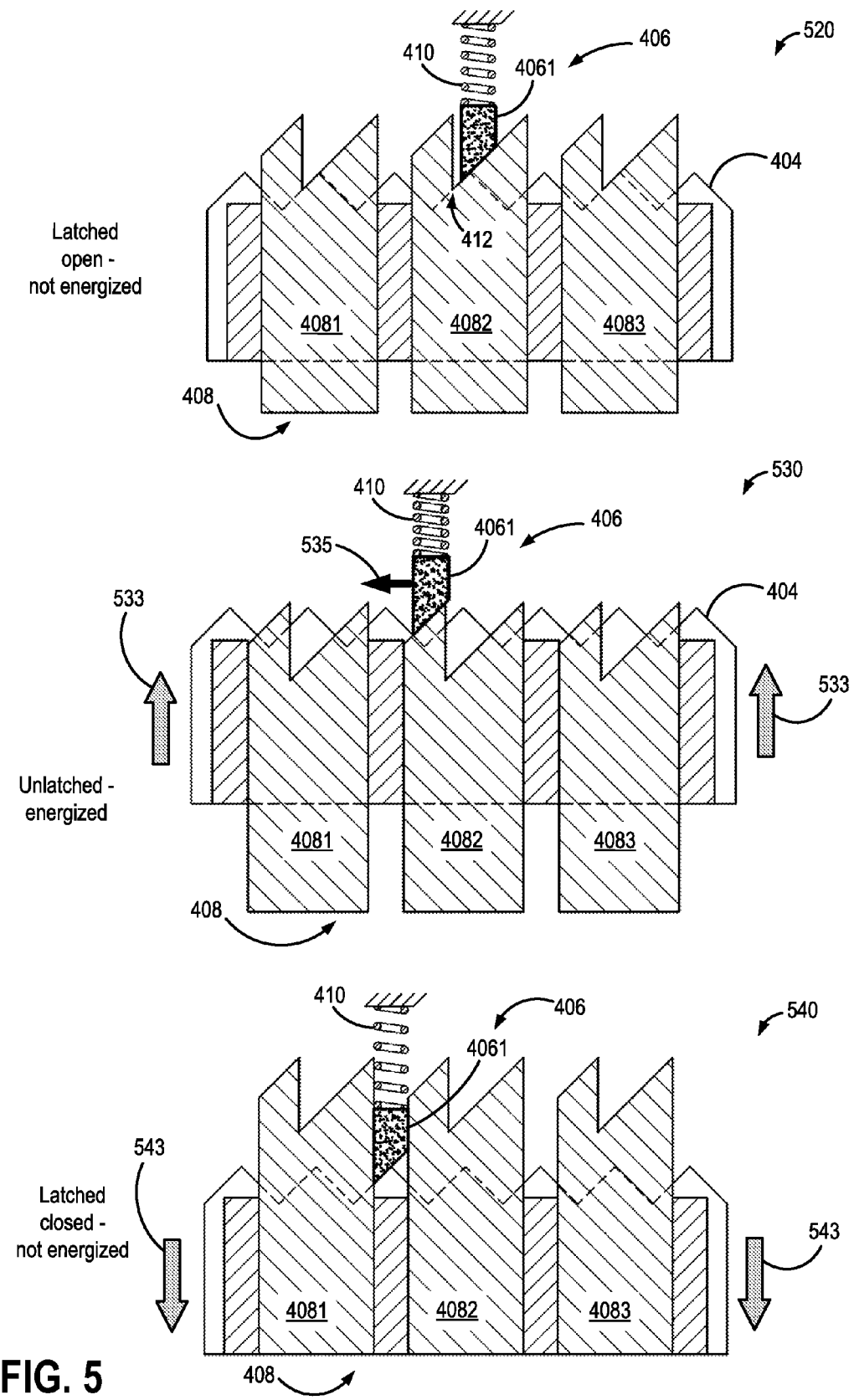

FIG. 5 schematically depicts adjusting the latchable refueling valve to a latched closed position from the latched open position.

Figure 6:
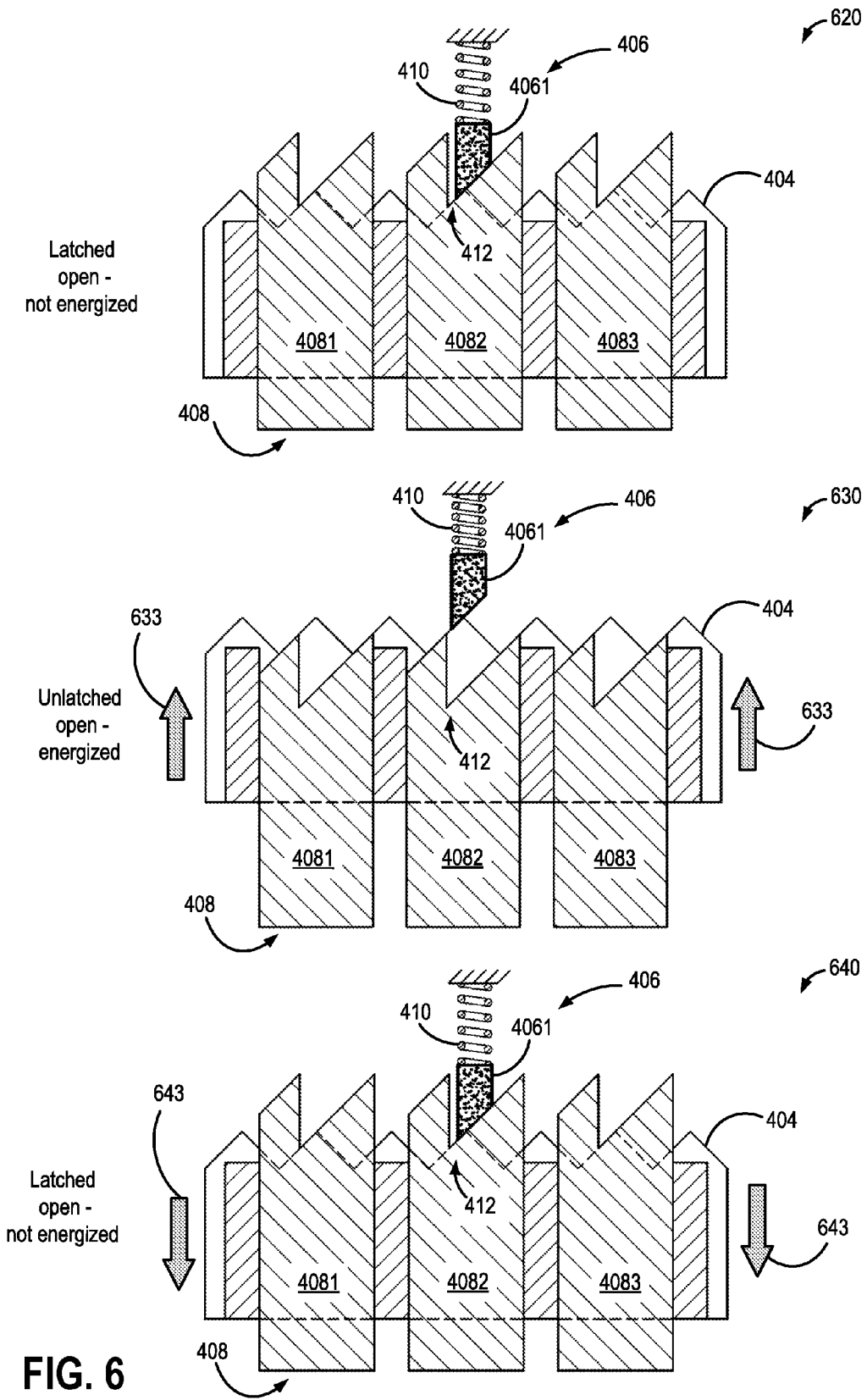

FIG. 6 schematically portrays modifying the latchable refueling valve to an unlatched open position from the latched open position.

Figure 7:
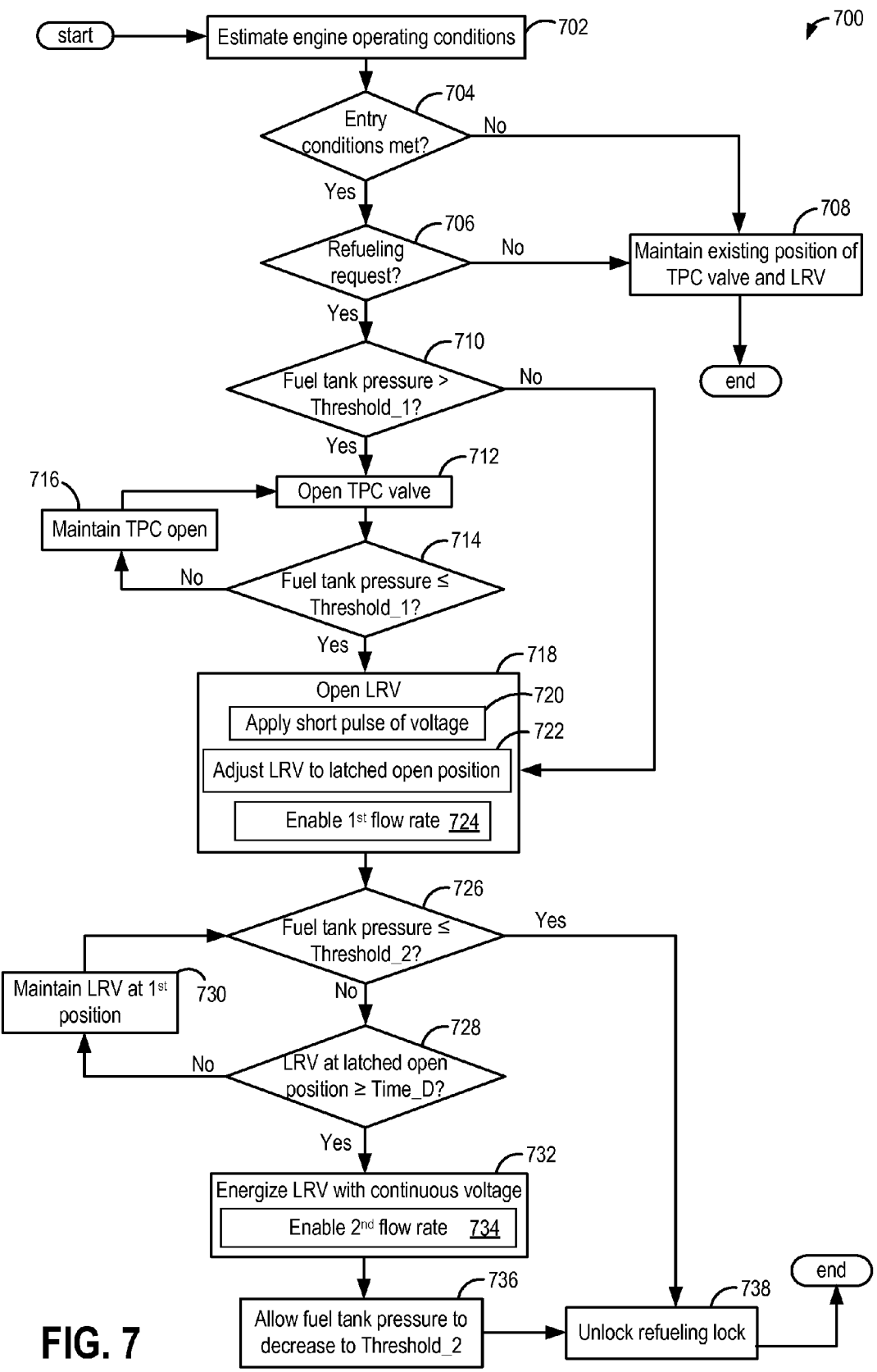

FIG. 7 shows an example flowchart for depressurizing a fuel tank in response to a tank refueling request, in accordance with the present disclosure.

Figure 8:
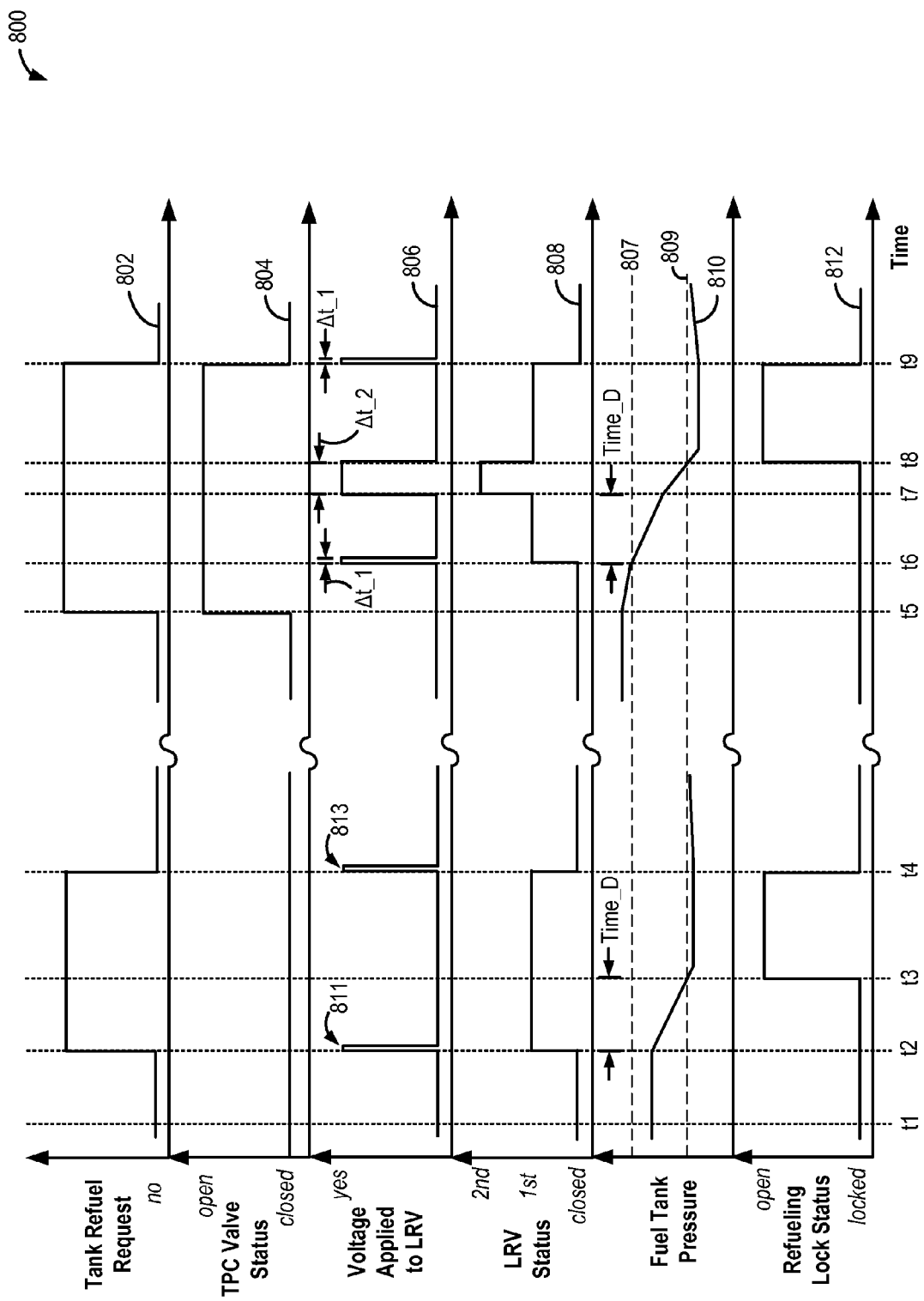

FIG. 8 shows an example timeline for depressurizing a fuel tank in response to a tank refueling request according to the present disclosure.

DETAILED DESCRIPTION

Figure 1:
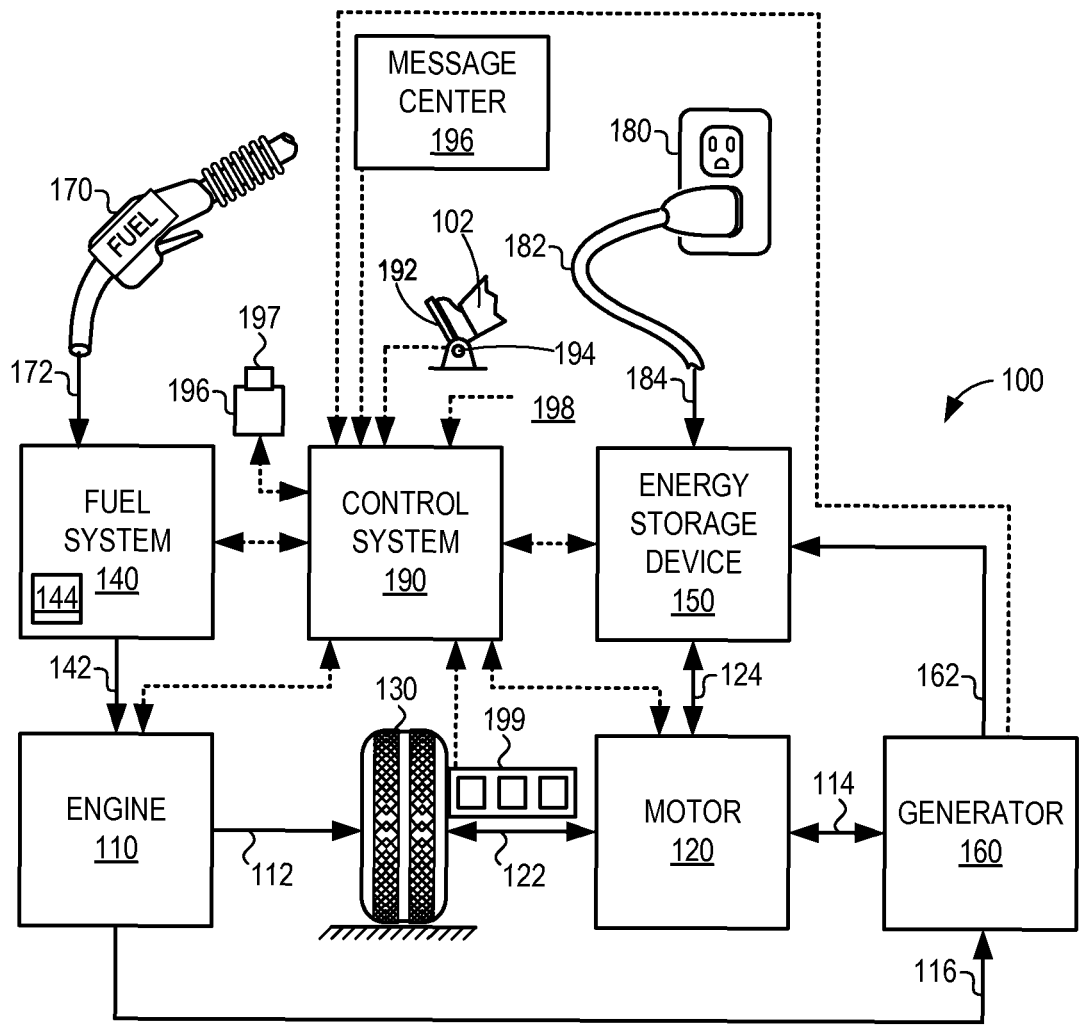
FIG. 1 shows an example vehicle propulsion system.
Figure 2:
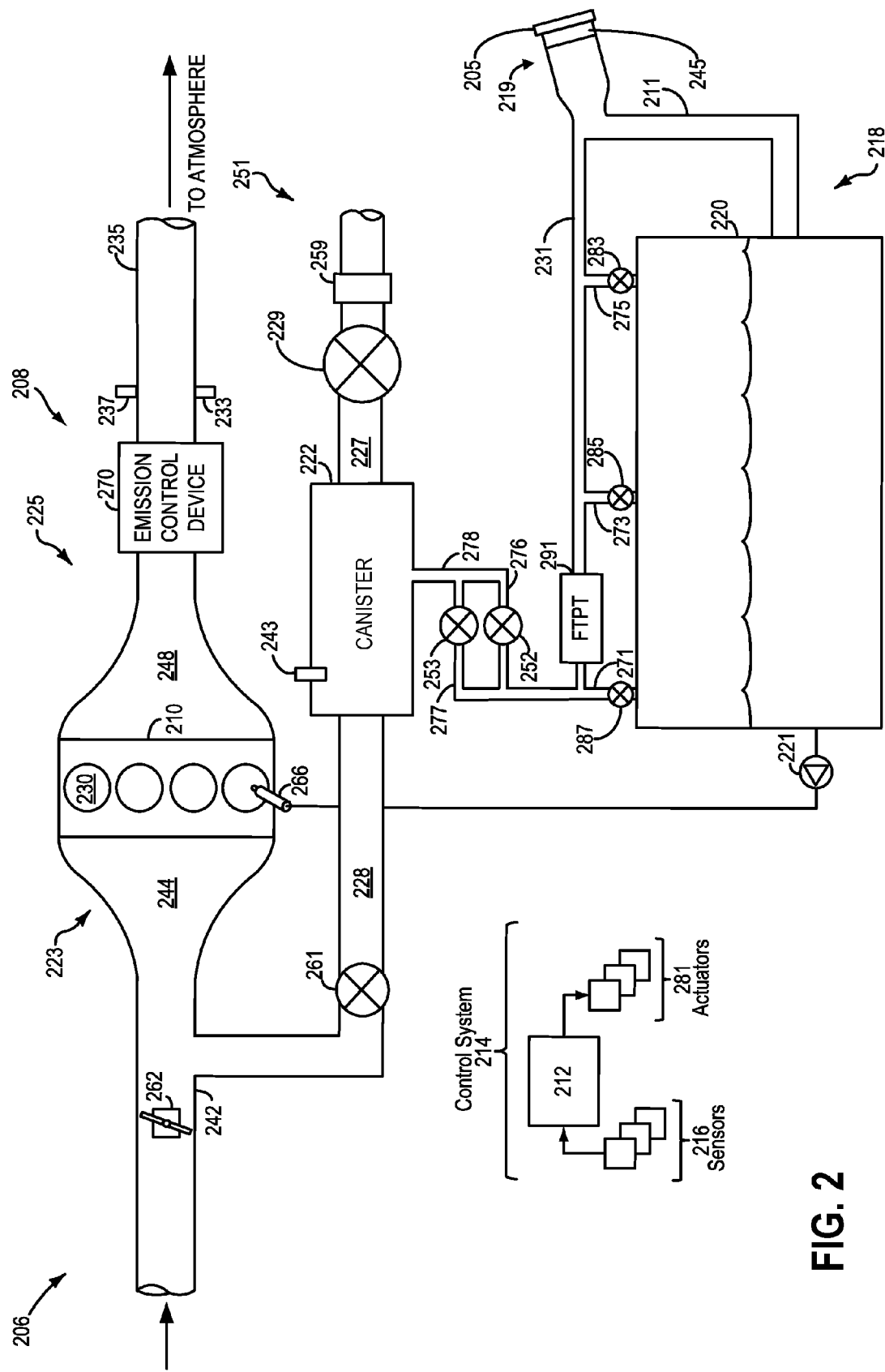
FIG. 2 shows an example vehicle system with a fuel system and an evaporative emissions system.
Figure 3:
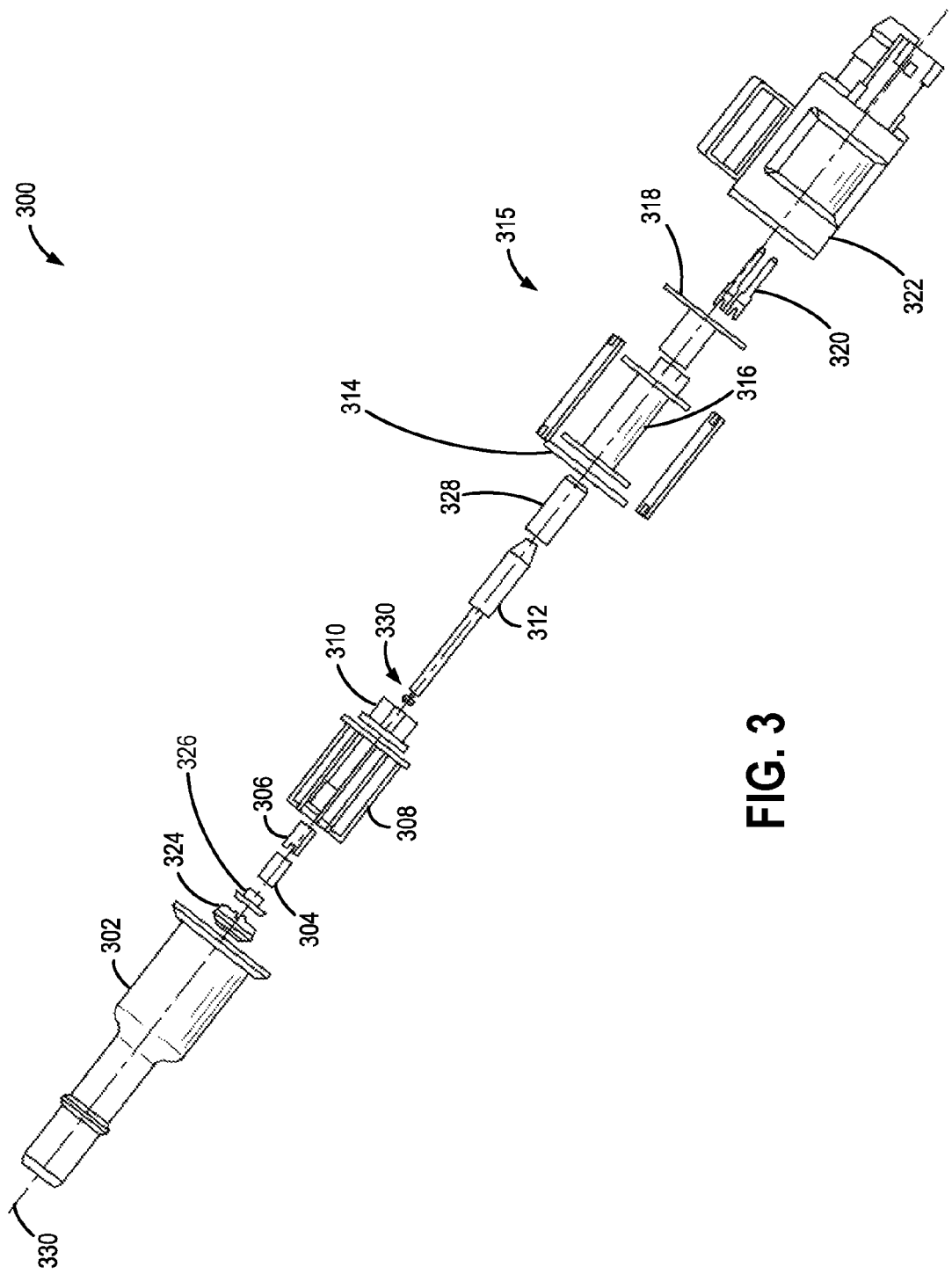
FIG. 3 shows an exploded view of a latchable refueling valve included within the evaporative emissions system of the example vehicle system of FIG. 2.

The following description relates to systems and methods for depressurizing a fuel tank via a latchable refueling valve. The fuel tank may be included in a vehicle, such as a hybrid electric vehicle, as shown in FIG. 1. The vehicle may include a fuel system and an evaporative emissions system, as shown in FIG. 2. The fuel system may be coupled to the evaporative emissions system via each of a tank pressure control valve and the latchable refueling valve (FIG. 3). The latchable refueling valve may be adjusted from a latched closed position to a latched open position via a first pulse of voltage (FIG. 4). Further, the latchable refueling valve may be adjusted from the latched open position to the latched closed position by a second pulse of voltage (FIG. 5). Furthermore, the latchable refueling valve may be held at a more open position relative to the latched open position by applying a continuous voltage (FIG. 6). Fuel pressure within the fuel tank may rise substantially due to diurnal vapors and hot ambient conditions. Accordingly, a refueling request by a vehicle operator may initiate depressurization of the fuel tank. First, the tank pressure control valve may be opened to reduce fuel tank pressure below a first threshold, followed by adjusting the latchable refueling valve to the latched open position to reduce fuel tank pressure below a second pressure threshold (FIG. 7). If the fuel tank pressure is not lower than the second pressure threshold within a pre-determined duration, the latchable refueling valve may be adjusted to the unlatched open position via a continuous supply of voltage. The unlatched open position may provide a faster flow rate and fuel tank depressurization may be expedited (FIG. 8).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 7, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container such as fuel vapor canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218. Fuel vapor canister 222 may also be termed canister 222 herein.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an optional air filter 259 disposed therein upstream of canister 222. Flow of air and vapors between canister 222 and the atmosphere may be regulated by a canister vent valve 229.

As depicted, fuel tank 220 is fluidically coupled to canister 222 via two conduits: a first conduit 276 and a second conduit 277. A tank pressure control (TPC) valve 252 (or TPC valve 252) is included within first conduit 276 while second conduit 277 includes latchable refueling valve 253 (LRV 253). First conduit 276 and second conduit 277 may merge to form canister entry conduit 278.

Canister vent valve 229 may be a normally open valve, so that TPC valve 252 and LRV 253 may control venting of fuel tank 220 with the atmosphere. TPC valve 252 and LRV 253 may be normally closed valves, that when opened, allow for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261.

Prior art examples may include a single fuel tank isolation valve (FTIV) coupled between fuel tank 220 and fuel canister 222 (or between fuel tank 220 and purge line 228 or vent line 227). However, a continuous supply of voltage may be demanded by the FTIV when it is held open to depressurize the fuel tank. This continuous voltage may increase power consumption. In contrast, the example vehicle system in FIG. 2 depicts fuel system 218 fluidically coupled to emission control system 251 by each of TPC valve 252 and LRV 253. Both TPC valve 252 and LRV 253 may be solenoid valves. TPC valve 252 may have a smaller orifice and a smaller aperture than LRV 253. LRV 253 may be configured to allow a higher flow rate than TPC valve 252.

Further, LRV 253 includes a latch that can be modulated to different positions via finite pulses of voltage, as will be explained in reference to FIGS. 4, 5, and 6. Specifically, LRV 253 can be opened by adjusting the latch on a latch guide such that the LRV is in a latched open position with a first finite pulse of voltage. When the LRV 253 is to be closed, the latch may be shifted to enable the latched closed position via a second finite pulse of voltage. As such, a stator and armature within LRV 253 may be energized for shorter durations to transition the LRV from the latched open position to the latched closed position and vice versa. To elaborate, the LRV may receive power exclusively to transition from the latched closed position to the latched open position and from the latched open position to the latched closed position. The LRV may not receive power to be maintained in either the latched open position or the latched closed position. Accordingly, the LRV may provide a reduction in power consumption.

During refueling events, and when pressure in fuel tank 220 is higher than a first pressure threshold, TPC valve 252 may be opened to decrease the pressure in fuel tank 220 to the first pressure threshold. As mentioned earlier, TPC valve 252 may have a smaller orifice diameter than the orifice diameter of LRV 253. Thus, by opening TPC valve 252 first, the pressure in the fuel tank may be bled down gradually until the first pressure threshold is attained. LRV 253 may then be opened to vent fuel vapors from fuel tank 220 to canister 222 at a faster rate. As such, the LRV 253 may be adjusted to the latched open position from the latched closed position. LRV 253 may be a normally closed (e.g., latched closed) valve that is opened in response to certain conditions. For example, LRV 253 may be actuated to the latched open position when the pressure in fuel tank 220 is at or below the first pressure threshold.

The refueling lock, however, may be unlocked to open a fuel cap only after fuel tank pressure attains a second pressure threshold. Fuel tank pressure at which the LRV 253 is opened (e.g., the first pressure threshold) may be higher than the fuel tank pressure when the refueling lock 245 is unlocked (e.g., the second pressure threshold).

During conditions when the fuel tank is taking a longer time to depressurize to the second pressure threshold, the LRV 253 may be adjusted to an unlatched open position. The unlatched open position may provide a faster flow rate than the latched open position and may expedite depressurization. Further, the unlatched open position may include energizing the LRV continuously. A routine for a refueling operation according to the present disclosure is described herein and with reference to FIG. 7.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, LRV 253, TPC valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 7. The controller 212 receives signals from the various sensors of FIG. 2 and employs the various actuators of FIG. 2 to adjust engine operation based on the received signals and instructions stored on a memory of the controller.

Turning now to FIG. 3, it shows an exploded view 300 of a latchable refueling valve (LRV), such as LRV 253 of FIG. 2. LRV of FIG. 3 includes a cap 302 that may be fluidically coupled to a fuel tank of a vehicle, such fuel tank 220 of FIG. 2. Overmold 322 may be coupled to a fuel vapor canister, such as canister 222 of FIG. 2. Further, the cap and overmold may be coupled to each other, e.g. mechanically, and may enclose various components of the LRV within.

The LRV depicted in FIG. 3 is a solenoid valve, and accordingly includes armature 312 and stator assembly 315, the stator assembly 315 comprising lower stator 314 and upper stator 318. Of these, upper stator 318 alone may be magnetically conductive. Alternatively, each of lower stator 314 and upper stator may be magnetically conductive. Stator assembly 315 also includes an electric coil (not shown) wound around bobbin 316. The electric coil may be coupled to a source of electricity such as a battery in a vehicle via terminals 320. In the example of the hybrid vehicle system of FIG. 1, the electric coil may receive a supply of electricity from energy storage device 150. When a voltage (and current) is supplied to the electric coil, upper stator 318 may be magnetized and the armature 312 may be drawn towards the upper stator 318. As such, upper stator 318 may be fitted into a bore within bobbin 316. Further, at least a first portion of armature 312 may be enclosed within sleeve 328. In turn, sleeve 328 may be surrounded at least partially by each of bobbin 316 and upper stator 318.

Armature 312 may have a second end 330 formed to couple to each of index 304 and latch 306. Further, index 304 may be coupled to each of poppet 324 and insert 326. As such, second end 330 of armature 312 is also coupled (e.g., mechanically) to each of poppet 324 and insert 326. Further, index 304 may be positioned adjacent to and in direct contact with latch 306. Latch guide 308 may encircle each of latch 306, index 304, and at least a portion of second end 330 of armature 312. Latch 306 may be in direct contact with latch guide 308. To elaborate, latch 306 may be latched onto latch guide 308. Further, though not shown, latch 306 includes one or more prongs that enable latch 306 to be latched onto latch guide 308. As such, a central axis of latch guide 308 may be the same as a central axis of latch 306, and a central axis of index 304. Further, a central axis of armature 312 may be the same as the central axis of latch guide 308 and a central axis of bobbin 316. As depicted in exploded view 300, the latchable refueling valve of FIG. 3 has a central axis 330. It will be appreciated that the central axis of latch guide 308, central axis of latch 306, the central axis of index 304, the central axis of armature 312, and the central axis of bobbin 316 may be the same as central axis 330.

A spring cup 310 may be positioned within latch guide 308 atop latch 306. Specifically, spring cup 310 may be coupled to and in direct contact with latch 306. Spring cup 310 may be positioned opposite to index 304 relative to latch 306. As will be described further herein, when the latchable refueling valve is energized (e.g., by flowing current through the electric coil around bobbin 316), index 304 pushes latch 306 off of the latch guide 308 from an initial position and when de-energized, latch 306 is released and it latches onto latch guide 308 again, at a different position from the initial position. An exception to the above occurs when the latchable refueling valve is adjusted from the latched open position to the unlatched open position and back to the same latched open position.

It will be noted that latch guide 308 may be fixed and may not rotate around its central axis or move axially. Conversely, latch 306 may rotate around its central axis. Prongs formed on the latch may be shifted from a first location (e.g., of latched open position) on the latch guide and adjusted to a second location (e.g. for a latched closed position) on the latch guide to provide a change in position of the LRV. It will also be noted that poppet 324, insert 326, index 304, latch 306, and latch guide 308 may be enclosed within cap 302.

An orifice of the latchable refueling valve may be included within cap 302 (not shown). Fuel vapors from the fuel tank may flow via the orifice of the latchable refueling valve towards the canister when the latchable refueling valve is opened.

When the LRV is energized (specifically, when the upper stator of the LRV is magnetized), the armature 312 is drawn towards the upper stator 318. The LRV may be energized for a brief moment via a voltage pulse. Since the second end 330 of the armature 312 is coupled to the index 304, the index 304 is simultaneously drawn in a direction towards the bobbin 316. As the index 304 is in direct contact with latch 306, the latch 306 is shifted off the first location in the latch guide 308, towards the direction of the bobbin 316. When the LRV is de-energized at the end of the voltage pulse, the upper stator is de-magnetized and the armature is returned to its original position. At the same time, the latch is rotated and slides into the second location on the latch guide. The first location of the latch on the latch guide may enable a latched open position of the LRV while the second location on the latch guide may enable a latched closed position of the LRV. Alternatively, the first location of the latch on the latch guide may enable the latched closed position of the LRV while the second location on the latch guide may enable the latched open position of the LRV.

Turning now to FIGS. 4, 5, and 6, they depict transitioning a latchable refueling valve (LRV) such as LRV 253 of FIG. 2 between a closed, an open, and a more open position. Specifically, FIG. 4 illustrates a transition of the LRV from a latched closed position to a latched open position, FIG. 5 depicts a transition from the latched open position to the latched closed position, and FIG. 6 portrays a transition from the latched open position to an unlatched open (more open) position, and back to the latched open position.

The schematic depictions in FIGS. 4, 5, and 6 include specific components of the LRV such as a latch guide 408, a prong 4061 of latch 406, index 404, and spring cup 410. As such, latch guide 408 may be similar to latch guide 308 of exploded view 300 in FIG. 3. Further, latch 406 may be similar to latch 306, index 404 may be similar to index 304, and spring cup 410 may be similar to spring cup 310, respectively, of exploded view 300 in FIG. 3. Further, spring cup 410 may be compressed against a surface such as a flange of bobbin 316 of FIG. 3 (not shown in FIGS. 4, 5, and 6). All views of the FIGS. 4, 5, and 6 show three teeth of the latch guide 408, labeled 4081, 4082, and 4083. The latch guide may have additional teeth, without departing from the scope of this disclosure. Further, all views of the FIGS. 4, 5, and 6 depict a single prong 4061 of the latch 406. However, latch 406 may include additional prongs than depicted. Similarly, index 404 may include additional or fewer teeth than shown in FIGS. 4, 5, and 6 without departing from the scope of this disclosure.

FIG. 4 shows first view 420, second view 430, and third view 440 which represent subsequent movements of the latch and the index relative to the latch guide. As such, second view 430 may follow first view 420, while third view 440 may succeed second view 430. Specifically, first view 420 represents component positions of the LRV when the LRV is in a latched closed position. Second view 430 shows component positions of the LRV when a finite pulse of voltage is applied to the LRV and third view 440 depicts component positions of the LRV when the finite pulse of voltage ends resulting in a latched open position of the LRV. It will be appreciated that the time duration for the transition from first view 420 to third view 440 may be significantly short. For example, the LRV may be adjusted to the latched open position from the latched closed position in milliseconds e.g. a duration of a voltage pulse.

First view 420 indicates the depicted components of the LRV when the LRV is in the latched closed position. Further, the LRV is not energized in first view 420. Herein, latch 406 (specifically, a prong 4061 of latch 406) is positioned between two adjacent teeth of latch guide 408 (e.g., first location). To elaborate, prong 4061 of latch 406 is located between tooth 4082 and tooth 4083. Further, prong 4061 of latch 406 is in direct contact with index 404. Further still, prong 4061 (and latch 406) is in direct contact with spring cup 410 (represented schematically as a spring). As shown, spring cup 410 and index 404 are located on opposite sides of the prong 4061 (and latch 406). To elaborate, spring cup 410 is positioned on a first side of latch 406 while index 404 is positioned on a second side of the latch 406, wherein the first side is opposite of the second side. Thus, the latch 406 is arranged between index 404 and spring cup 410.

When the latched open position of the LRV is desired, e.g. when depressurizing the fuel tank after the first pressure threshold is attained, the LRV may be energized, as shown in second view 430. As mentioned earlier, a finite voltage pulse may be supplied to the LRV which magnetizes the upper stator within the LRV (refer to FIG. 3). In response, the armature within the LRV is pulled away from the cap of the LRV and towards bobbin 316. Simultaneously, the index 404, being coupled to the armature, is also drawn away from the cap of the LRV. This change in position of the index is depicted in second view 430, wherein index 404 is shown moving upwards (e.g., arrows 433) in the direction of the spring cup 410. Since the latch 406 (and prong 4061) is in direct contact with the index 404, prong 4061 of latch 406 is pushed out of its first location between tooth 4082 and tooth 4083 by index 404. Simultaneously spring cup 410 may be strongly compressed. Thus, the LRV may be unlatched and energized at second view 430.

Third view 440 demonstrates a de-energized LRV in the latched open position. As the LRV is de-energized from second view 430, the pulse of voltage is terminated and the armature (not shown) along with the index 404 shifts away from the upper stator within the LRV (refer to FIG. 3). As such, index 404 moves away from spring cup 410 as shown by arrows 443 and assumes a position between the position of index 404 in first view 420 and that in second view 430. As such, the spring cup 410 may be moderately compressed in third view 440. However, prong 4061 of latch 406 rotates (as shown by bold arrow 435 in second view 430) and drops down into a notch 412 in tooth 4082 of latch guide 408. The rotation of prong 4061 of latch 406 is towards the left of the observer. This position of prong 4061 of latch 406 may be termed second location of the latch within latch guide 408.

At this latched open position of the LRV, fuel vapors may flow from the fuel tank into the fuel vapor canister at a first flow rate via the orifice of the LRV.

FIG. 5 shows first view 520, second view 530, and third view 540 which represent subsequent movements of the latch and the index relative to the latch guide. As such, second view 530 may follow first view 520, while third view 540 may succeed second view 530. Specifically, first view 520 represents component positions of the LRV when the LRV is in the latched open position (de-energized). Second view 530 shows component positions of the LRV when a finite pulse of voltage is applied to the LRV and third view 540 depicts component positions of the LRV when the finite pulse of voltage ends resulting in the latched closed position of the LRV. It will be appreciated that the time duration for the transition in FIG. 5 from first view 520 to third view 540 may be significantly short, e.g. a duration of the voltage pulse.

First view 520 indicates the depicted components of the LRV when the LRV is in the latched open position, similar to third view 440 of FIG. 4. Herein, latch 406 (specifically, prong 4061 of latch 406) is positioned in notch 412 within tooth 4082 of latch guide 408. Further, prong 4061 of latch 406 is in direct contact with index 404. Further still, index 404 is at a position between the positions of index 404 in each of first view 420 and second view 430 of FIG. 4. The spring cup may be moderately compressed in the position of first view 520 (or third view 440 of FIG. 4).

When the latched closed position of the LRV is desired, e.g. upon completing refueling of the fuel tank, the LRV may be energized as shown in second view 530 of FIG. 5. As elaborated earlier, a voltage pulse may be supplied to the LRV which magnetizes the upper stator within the LRV (refer to FIG. 3). In response, the armature within the LRV is pulled away from the cap of the LRV. Simultaneously, the index 404 is also drawn away from the cap of the LRV. This change in position of the index is depicted in second view 530, wherein index 404 is shown moving upwards towards spring cup 410 (depicted by arrows 533). Since the latch 406 (and prong 4061) is in direct contact with the index 404, prong 4061 of latch 406 is pushed out of notch 412 in tooth 4082 by index 404. Herein, prong 4061 (and latch 406) is suspended above latch guide 408. Simultaneously spring cup 410 may be strongly compressed. Thus, the LRV may be unlatched and energized at second view 530.

When the voltage pulse is terminated, the LRV is de-energized, as shown in third view 540 of FIG. 5. Further, the armature (not shown) along with the index 404 return to their original position (of first view 420). Herein, index 404 may assume the position of index 404 in first view 420 of FIG. 4. However, prong 4061 of latch 406 rotates and slides down between tooth 4082 and tooth 4081. As shown in second view 530 of FIG. 5, latch 406 rotates towards the left side (depicted by bold arrow 535), relative to the observer, enabling prong 4061 to drop down in a gap formed between tooth 4082 and tooth 4081 of latch guide 408. In the third view 540, spring cup 410 may be substantially released. In other words, spring cup 410 may be least compressed relative to the respective positions of the spring cup in first view 520 and second view 530 of FIG. 5. Further, this position of the latch may be termed a third location of the latch 406 in latch guide 408. As such, the LRV may now be in the latched closed position since prong 4061 of latch 406 is arranged between adjacent teeth of latch guide 408. Furthermore, when in the latched closed position, the LRV blocks fuel vapor flow from the fuel tank into the evaporative emissions system. Additionally, the LRV may not be energized in this latched closed position of third view 540 of FIG. 5.

Turning now to FIG. 6, it demonstrates a transition of the LRV from the latched open position to an unlatched open (more open) position, and back to the latched open position. FIG. 6 shows first view 620, second view 630, and third view 640 which represent subsequent movements of the latch and the index relative to the latch guide. As such, second view 630 may follow first view 620, while third view 640 may succeed second view 630. However, the duration between first view 620 and third view 640 of FIG. 6 may be considerably longer than the duration between first view 420 and third view 440 of FIG. 4. Similarly, the duration between first view 620 and third view 640 of FIG. 6 may be substantially higher than the duration between first view 520 and third view 540 of FIG. 5.

The LRV may be held in the energized open position, also termed the unlatched open position (depicted in second view 630 of FIG. 6), when fuel tank pressure is higher than the second pressure threshold (for unlocking the refueling lock) after a pre-determined duration at the latched open position. The unlatched open position of the LRV may provide a faster flow rate than that at the latched open position. Accordingly, prior to refueling, if the fuel tank pressure remains higher than the second pressure threshold after the pre-determined duration, the LRV may be energized and held in the unlatched open position to expedite depressurization of the fuel tank. In one example, flow rate of fuel vapors may be increased by 15% when the LRV is held at the unlatched open position compared to the flow rate at the latched open position.

Returning to FIG. 6, first view 620 represents component positions of the LRV when the LRV is in a latched open position (similar to third view 440 of FIG. 4). Second view 630 shows component positions of the LRV when a continuous voltage is applied to the LRV and third view 640 depicts component positions of the LRV when the continuous voltage is terminated resulting in resuming the latched open position of the LRV.

In the first view 620 of FIG. 6, the LRV is not energized and is in the latched open position with prong 4061 of latch 406 situated in notch 412 of tooth 4082. In response to determining that a higher vapor flow rate is desired (e.g., when fuel tank pressure is higher than the second pressure threshold after a pre-determined duration at the latched open position), the LRV may be energized. Second view 630 of FIG. 6 depicts the energized LRV wherein index 404 impels prong 4061 of latch 406 out of notch 412 in tooth 4082. Index 404 moves upwards towards spring cup 410 as depicted by arrows 633 when the LRV is energized compressing the spring strongly. Second view 630, therefore, depicts the unlatched open position of the LRV which may enable a higher flow rate for fuel vapors than the latched open position of the LRV. Further, prong 4061 of latch 406 may be held suspended above latch guide 408 until fuel tank pressure drops to the second pressure threshold and the refueling lock is opened.

In response to fuel tank pressure reaching the second pressure threshold, the LRV is de-energized (as shown in third view 640 of FIG. 6), and prong 4061 of latch 406 returns to its earlier position in notch 412 of tooth 4082. Specifically, the LRV is de-energized to the latched open position in third view 640 from the unlatched open position in second view 630 of FIG. 6. The direction of movement of index 404 and latch 406 is shown by arrows 643. It will also be noted that the prong 4061 of latch 406 is not rotated between the first view 620, second view 630, and third view 640 of FIG. 6.

It will be appreciated that in adjusting the LRV from a latched open position to an unlatched open position and back to the latched open position, the location of the prong of the latch may not change relative to the teeth of the latch guide between first view 620 and third view 640.

Thus, the LRV is capable of assuming three positions: a latched closed position wherein fuel vapor flow through the LRV may be blocked, a latched open position allowing fuel vapor flow at a first flow rate, and an unlatched open position enabling fuel vapor flow rate at a second flow rate, the second flow rate being higher than the first flow rate.

FIG. 7 depicts an example control routine 700 for refueling a vehicle system, such as the vehicle systems depicted in FIGS. 1-2. In particular, control routine 700 may manage the depressurization of a fuel tank in response to a refueling request from a vehicle operator. Instructions for carrying out routine 700 may be executed by a controller, such as controller 212 of FIG. 2, based on instructions stored on a memory of the controller and in conjunction with signals received from sensors of the engine and fuel system, such as the sensors described above with reference to FIG. 2. The controller may employ actuators of the engine to adjust engine operation, according to the methods described below. Specifically, the controller may employ actuators such as the tank pressure control (TPC) valve and latchable refueling valve (LRV) to depressurize the fuel tank.

At 702, routine 700 estimates engine operating conditions. Engine operating conditions may be estimated, measured, or inferred, and may include various vehicle conditions, such as vehicle speed, as well as various engine operating conditions, such as engine operating mode, engine speed, engine temperature, exhaust temperature, air-fuel ratio, battery state-of-charge (SOC), MAP, MAF, torque demand, horsepower demand, etc.

Next, at 704, routine 700 determines if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running. Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures. If entry conditions are not met, routine 700 proceeds to 708 to maintain the status of the TPC valve and LRV. Routine 700 may then end.

If entry conditions are met at 704, method 700 proceeds to 706 to determine if a refueling request occurs. For example, a refuel request may comprise a vehicle operator depressing a button, e.g., refueling button 197, on a vehicle instrument panel in the vehicle, e.g., instrument panel 196. Thus, the refuel request may include manually requesting opening of a fuel cap coupled to the fuel tank. For example, a vehicle operator may provide input to the vehicle system indicating a desire to refuel the vehicle. If a refuel request does not occur at 706, routine 700 may proceed to 708. At 708, routine 700 may include maintaining the status of the TPC valve and LRV. Routine 700 may then end.

If a refuel request occurs at 706, routine 700 continues to 710 to determine whether the fuel tank pressure is greater than a first pressure threshold, Threshold_1. Fuel tank pressure may be greater than the first pressure threshold during ambient conditions, such as hot weather conditions, that increase fuel evaporation in the fuel tank. As such, during cooler weather, fuel vaporization may be lower and fuel tank pressure may be lower than the first pressure threshold between successive tank refueling events.

Fuel tank pressure may be determined through a pressure sensor coupled within the fuel tank, such as pressure sensor 291 of FIG. 2. If the fuel tank pressure is not greater than the first pressure threshold, Threshold_1, routine 700 progresses to 718 to open the LRV. If the fuel tank pressure is greater than the first pressure threshold, Threshold_1, routine 700 continues to 712 to open the TPC valve. By opening the TPC valve, fuel tank pressure may be reduced to the first threshold pressure. By releasing the higher fuel tank pressure (higher than the first pressure threshold, Threshold_1) initially via the TPC valve, fuel tank vent valves are not exposed to significant pressure differentials during refueling events which may close the vent valves, and thus may prevent adequate refueling.

It will be appreciated that the TPC valve is opened responsive to fuel tank pressure being higher than the first pressure threshold. As such, when fuel tank pressure is lower than the first pressure threshold, the LRV may be opened without opening the TPC valve.

The TPC valve may be opened at 712 while maintaining the LRV in a closed position. Herein, the LRV may be at the latched closed position and fuel vapors may not flow from the fuel tank to the fuel vapor canister via the LRV. However, fuel vapors may exit the fuel tank towards the fuel vapor canister through the TPC valve. Opening the TPC valve may include actuating a solenoid coupled to the TPC valve. In this way, fuel vapors may be released to the evaporative emission system of the vehicle via the TPC valve. Since the orifice of the TPC valve may be smaller, fuel vapor flow may be slower and fuel tank depressurization may occur gradually. Since fuel tank pressure is higher than the first pressure threshold, an initial slower release of vapors may provide tank depressurization without degrading fuel system components.

Next, at 714, routine 700 determines if fuel tank pressure has decreased to the first pressure threshold. If no, routine 700 continues to 716 to maintain open the TPC valve. If fuel tank pressure is lower than the first pressure threshold, routine 700 proceeds to 718 to open the LRV. As such, the LRV may be opened while maintaining the TPC valve in an open position. Alternatively, the TPC valve may be closed while the LRV is open.

Opening the LRV may include actuating a solenoid, as described in reference to FIG. 3, and adjusting the LRV to the latched open position. In other words, the LRV may be adjusted to the latched open position from the latched closed position via a pulse of voltage, as described in FIG. 4. Thus, at 720, a short pulse of voltage is applied to the LRV, and the latch is adjusted such that the LRV is in its latched open position at 722. Further, a first flow rate through the LRV is enabled at 724. As such, fuel vapors from the fuel tank may now flow through the LRV towards the fuel vapor canister. Next, at 726, routine 700 determines if fuel tank pressure has reduced to a second pressure threshold, Threshold_2. The controller may unlock the refueling lock only after the fuel tank pressure is at or below the second pressure threshold.

It will be noted that the second pressure threshold may be lower than the first pressure threshold. Specifically, the fuel tank pressure at which the LRV is opened (e.g., the first pressure threshold) may be higher than the fuel tank pressure when the controller unlocks the refueling lock (e.g., the second pressure threshold).

If it is determined at 726 that fuel tank pressure is lower than the second pressure threshold, routine 700 proceeds to 738 to unlock the refueling lock. However, if it is determined that the fuel tank pressure remains higher than the second pressure threshold, routine 700 continues to 728 to confirm if the LRV has been maintained at the latched open position for a pre-determined duration, Time_D. The pre-determined duration may be a time threshold stored in the controller for adjusting the position of the LRV to a more open position such as the unlatched open position when tank pressure is higher than the second pressure threshold. The pre-determined duration, in one example, may be 20 seconds. In another example, Time_D may be 30 seconds. As such, by ensuring that the LRV remains open at the latched open position allowing fuel vapor flow at a first flow rate for the pre-determined duration, and not for longer than the pre-determined duration, a faster tank depressurization may be achieved.

If it is confirmed at 728 that the LRV has been held at the latched open position for less than the pre-determined duration, Time_D, routine 700 progresses to 730 to maintain the LRV at the latched open position. On the other hand, if the LRV has been at the latched open position for the pre-determined duration, routine 700 continues to 732 to adjust the LRV to the unlatched open position, as described earlier in reference to FIG. 6. As such, the LRV may be adjusted to a more open position by actuating the solenoid and energizing the LRV with a continuous voltage at 732. As explained earlier, the unlatched open position of the LRV enables a second flow rate through the LRV at 734. Further still, the second flow rate may be higher than the first flow rate obtained when the LRV is in the latched open position.

At 736, routine 700 includes allowing the fuel tank pressure to decrease to (or below) the second pressure threshold. As described earlier, the second pressure threshold may represent a lower fuel tank pressure than the first pressure threshold introduced at 714. In some embodiments, at 736, routine 700 may include allowing the fuel tank pressure to decrease to atmospheric pressure. When the fuel tank pressure has decreased to (or below) the second pressure threshold, Threshold_2, routine 700 proceeds to 738. At 738, routine 700 includes unlocking the refueling lock. Routine 700 may then end.

In this way, refueling may be accomplished only when the fuel tank pressure has decreased to or below the second pressure threshold. Further, by energizing the LRV continuously and holding the LRV at the unlatched open position only after the pre-determined duration at the latched open position, a balance between reducing fuel tank depressurization time and decreasing power consumption may be achieved. Further still, during hot weather conditions when the fuel tank pressure is higher than the first pressure threshold, the vehicle operator may not wait for longer durations to initiate the refueling.

Thus, an example method may comprise adjusting a latchable valve (e.g., latchable refueling valve) to a first, latched position (e.g., the latched open position) via a voltage pulse, the first, latched position enabling depressurization of a fuel tank, and responsive to a pressure in the fuel tank higher than a first pressure threshold after a pre-determined duration, moving the latchable valve to a second, unlatched position (e.g., the unlatched open position) with a continuously applied voltage, the second, unlatched position more open than the first latched position. The latchable valve may fluidically couple the fuel tank and a fuel vapor canister when adjusted to each of the first, latched position and the second, unlatched position, and fuel vapors may flow from the fuel tank to the fuel vapor canister when the latchable valve is in each of the first, latched position and the second, unlatched position. The fuel vapors may flow at a higher flow rate when the latchable valve is at the second, unlatched position relative to when the latchable valve is at the first, latched position. The continuously applied voltage may be applied for a longer duration than the voltage pulse.

The method may further comprise, unlocking a refueling lock responsive to the pressure in the fuel tank reducing below the first pressure threshold. Further, the method may adjust the latchable valve to a third, latched position via a voltage pulse after completion of refueling. The third latched position may include fully closing the latchable valve impeding flow of fuel vapors from the fuel tank into the fuel vapor canister. The method may also comprise supplying liquid fuel from the fuel tank to an engine of a motor vehicle, wherein the motor vehicle is propelled with each of the engine and an electric motor. Further, the latchable valve may be adjusted to the first, latched position in response to the pressure in the fuel tank decreasing to a second pressure threshold, the second pressure threshold (e.g., Threshold_1 in routine 700) being higher than the first pressure threshold (e.g., Threshold_2 in routine 700). Herein, the pressure in the fuel tank may decrease to the second pressure threshold in response to opening a tank pressure control valve, the tank pressure control valve opened in response to each of a refueling request and the pressure in the fuel tank being higher than the second threshold.

FIG. 8 depicts an example timeline 800 for venting a fuel tank upon a refueling request using the routine 700 described herein and with regards to FIG. 7. Timeline 800 includes plot 802, indicating the status of a tank refueling request over time. Timeline 800 also includes plot 804, indicating the status of a TPC valve over time; plot 806, indicating whether voltage is applied to the LRV; plot 808 indicating the status of a latchable refueling valve (LRV) over time; plot 810, indicating pressure inside a fuel tank over time; and plot 812, indicating the status of a refueling lock over time. Line 807 represents a first pressure threshold (e.g., Threshold_1 of FIG. 1) for fuel tank pressure. Line 809 represents a second pressure threshold (e.g. Threshold_2 of FIG. 7) for fuel tank pressure. As shown, the second pressure threshold is lower than the first pressure threshold. It will also be noted that the LRV may be varied between a latched closed position, a first position ($1^{st}$) representing the latched open position of third view 440 in FIG. 4, and a second ($2^{nd}$) position representing the unlatched open position of third view 640 in FIG. 6.

At time t1, no tank refuel request in indicated, as shown by plot 802. As such, the status of the TPC valve and the status of the LRV are maintained. As shown by plots 804 and 808, the valves are closed at time t1 and thus, are maintained closed. Specifically, the LRV may be at the latched closed position. Additionally, the refueling lock is maintained locked, as shown by plot 812.

At time t2, a refueling request is received, as shown by plot 802. Since the fuel tank pressure at time t2 is lower than first pressure threshold (line 807), the TPC valve is not opened, and is maintained closed at time t2. Further, the LRV is opened, as shown by plot 808, and adjusted from the latched closed position to the first position which is the latched open position. Additionally, the fuel cap is maintained in a locked conformation, as shown by plot 812.

From time t2 to time t4, the LRV is at the latched open position allowing for fuel vapors to vent from the fuel tank to the evaporative emissions system at the first flow rate. Accordingly, between time t2 and time t3, the fuel tank pressure decreases, as indicated by plot 810. At time t3, when a pre-determined duration (e.g., Time_D of FIG. 7) is completed by the LRV at the latched open position, fuel tank pressure drops below second pressure threshold (line 809). Since the fuel tank pressure reaches the second pressure threshold within the pre-determined duration, Time_D, the LRV is maintained at the latched open position between time t2 and time t3. As such, the LRV may not be shifted to the unlatched open position between time t2 and time t3. Further still, other than the pulse of voltage provided to the LRV at time t2, the LRV is not supplied with any voltage until time t4, reducing power consumption.

In response to fuel tank pressure dropping below the second pressure threshold, the refueling lock is unlocked and refueling may be initiated at time t3. Refueling may continue until time t4 and since LRV is maintained at the latched open position, fuel vapors from the fuel tank continue to flow to the fuel vapor canister in the evaporative emissions system of the vehicle. Consequently, fuel tank pressure may not change between time t3 and time t4.

At time t4, refueling is completed (as shown by plot 802) and the refueling lock is locked. Further, the LRV may be adjusted from the 1$^{st}$ position (latched open) to the closed position (latched closed) by energizing with a finite pulse of voltage at time t4. In response to the closing of the LRV, fuel vapors in the fuel tank may be trapped within the fuel tank and fuel tank pressure may gradually increase past time t4, as shown by plot 810.

It will be appreciated that the finite pulses of voltage supplied to the LRV at time t2 and time t4 may be supplied for substantially equal durations. To elaborate, a first pulse of voltage 811 applied to the LRV (e.g., to adjust the LRV from latched closed to latched open) at time t2 may be similar to a second pulse of voltage 813 applied to the LRV (e.g., to adjust the LRV from latched open to latched closed) at time t4. Further, as shown, the duration of the first pulse of voltage 811 and the duration of the second pulse of voltage 813 may be substantially equal.

Thus, voltage is supplied to the LRV for brief moments at time t2 and time t4 to modify the position of the LRV. When the LRV is maintained at either the latched open position or the latched closed position, power may not be consumed by the LRV. Accordingly, power may be consumed by the LRV between times t1 and t4 exclusively during transitioning from latched closed position to latched open position (e.g., at time t2) and during transitioning from the latched open position to the latched closed position (e.g., at time t4).

Between time t4 and time t5, a sufficient duration may ensue with multiple refueling events. As such, the vehicle may be operated for a considerable duration. To elaborate, vehicle drive cycle between times t1 and t4 may be distinct and dissimilar from drive cycle of the vehicle between times t5 and t9.

Prior to time t5, there is no refueling request, as shown by plot 802. The TPC valve and the LRV are both closed and the refueling lock is locked. Further, fuel tank pressure prior to time t5 is higher than the first pressure threshold (line 807). For example, pressure in the fuel tank may be higher than the first pressure threshold due to hot weather conditions. As such, a higher ambient temperature (e.g., 100° F. or higher) may increase a rate of fuel evaporation within the fuel tank causing the increase in fuel tank pressure.

At time t5, a distinct refueling request is received. Since the fuel tank pressure at time t5 is higher than first pressure threshold (line 807), the TPC valve is opened first (plot 804). Further, the LRV may be maintained closed at time t5 and fuel vapors may be released from the fuel tank into the fuel vapor canister at a slower pace via the smaller orifice of the TPC valve. Between time t5 and time t6, therefore, fuel tank pressure gradually decreases until at time t6, the fuel tank pressure is at the first pressure threshold (line 807) as shown by plot 810. By releasing the higher fuel tank pressure initially via the TPC valve, fuel tank vent valves may not be exposed to rapid pressure changes during refueling events. As such, rapid changes in pressure within the fuel tank may cork the vent valves, rendering them unusable for future fuel tank venting events.

At time t6, in response to the fuel tank pressure attaining the first pressure threshold, the LRV may be adjusted to the first position, which is the latched open position. Specifically, a pulse of voltage may be applied to the LRV, as shown by plot 806 at time t6, to adjust the LRV from the latched closed position to the latched open position. The pulse of voltage may be applied for a shorter duration, as at 811 and/or 813, indicated at time t6 as a duration of $\Delta t\_1$. The TPC valve may be maintained open.

Between time t6 and time t7, fuel tank pressure decreases but does not attain the second pressure threshold after completion of the pre-determined duration, Time_D. To elaborate, the pre-determined duration, Time_D, is measured from the transition of the LRV to the latched open position at time t6 until time t7. Responsive to fuel tank pressure remaining higher than the second pressure threshold (line 809) after the completion of the pre-determined duration, Time_D, the LRV is adjusted to the unlatched open position at time t7. Specifically, a continuous voltage may be supplied, contrary to a pulse of voltage, at time t7 to hold the LRV at the unlatched open position. Further, the voltage may be continuously supplied to the LRV from time t7, as shown by plot 806, until the fuel tank pressure reduces to (or below) the second pressure threshold. As described earlier, the continuous supply of voltage causes the LRV to be energized and maintained energized. Further, the latch may be suspended away from the latch guide in the unlatched open position of the LRV, which being a more open position enables a higher flow rate.

Accordingly, between time t7 and time t8, the fuel tank pressure decreases at a faster rate, as shown by plot 810. Thus, voltage is applied to the LRV continuously from time t7 until time t8, for a duration of $\Delta t\_2$. In response to the fuel tank pressure decreasing to the second pressure threshold at time t8, the refueling lock is unlocked. Simultaneously, the voltage supplied to the LRV is discontinued, allowing the LRV to assume the latched open position, as shown by plot 808.

At time t8, the LRV is at the first position and the TPC valve is also open allowing a transfer of refueling vapors from the fuel tank to the evaporative emissions system. Consequently, fuel tank pressure may not change substantially during refueling between time t8 and time t9. At time t9, refueling is completed and the refueling lock may be locked. Further, each of the TPC valve and the LRV may be closed. Specifically, a pulse of voltage may be applied to the LRV at time t9 to modify the position of the LRV from the latched open position to the latched closed position. As shown, the pulse of voltage to the LRV (plot 806) at time t9 may be applied for a duration similar to that at time t6, e.g. $\Delta t\_1$. Thus, the pulse of voltage applied to the LRV to shift its position from latched open to latched closed may be substantially equivalent to the pulse of voltage applied to adjust the LRV from the latched closed position to the latched open position.

It will also be appreciated that the LRV may be maintained at the unlatched open position, e.g., time t7 until time t8, by a continuous voltage applied for a longer duration ($\Delta t\_2$) relative to the duration of the pulse of voltage applied at time t6 and/or time t9. To elaborate, the LRV may receive voltage for a longer duration when at the unlatched open position relative to the duration of the pulse of voltage to adjust the LRV from a latched closed position to a latched open position. Similarly, the duration of continuously applied voltage to maintain the LRV at the unlatched open position, e.g., $\Delta t\_2$ at time t7 to time t8, may be longer than the duration of the voltage pulse applied to adjust the LRV from the latched open position to the latched closed position e.g. at time t9 and/or time t4.

In this manner, a latchable refueling valve (LRV) positioned between a fuel tank and a fuel vapor canister (part of an evaporative emissions system) may allow a faster depressurization of the fuel tank when refueling is requested. The LRV may assume a latched closed position, a latched open position, and an unlatched open position. Each of the latched open and the latched closed positions may consume nominal (e.g., minimal) power, whereas the unlatched open position demands a continuous supply of voltage and therefore, a higher power consumption. The LRV may receive a first pulse of voltage to enable transition from the latched closed position to the latched open position. Similarly, a second pulse of voltage may be applied to the LRV to adjust the LRV from the latched open position to the latched closed position. The first pulse of voltage may be similar to the second pulse of voltage. Specifically, a duration of the first pulse of voltage may be substantially equal to a duration of the second pulse of voltage.

During higher ambient temperatures, the fuel tank may experience a significantly higher fuel tank pressure. Therefore, prior to opening a refueling lock to allow refueling, the fuel tank pressure may be reduced by transferring fuel vapors from the fuel tank to the fuel vapor canister. If fuel tank pressure is higher than a first pressure threshold, a tank pressure control (TPV) valve may be opened first to allow a gradual bleeding of fuel vapors to the canister. By releasing the fuel tank pressure at a slower rate via the TPC valve (which has a smaller orifice), fuel tank vent valves may be protected from substantial pressure gradients which can degrade the fuel tank vent valves. The LRV may be at the latched closed position when fuel tank pressure is higher than the first pressure threshold. The transfer of fuel vapors from the fuel tank to the fuel vapor canister via the TPC valve may reduce fuel tank pressure to the first pressure threshold. In response to the fuel tank pressure reaching the first pressure threshold, the LRV may now be opened to enable a faster depressurization. Accordingly, a pulse of voltage may be delivered to the LRV to adjust the LRV from the latched closed position to the latched open position. Thus, fuel vapors may flow at a comparatively faster rate from the fuel tank to the fuel vapor canister via the LRV, since the LRV has a larger orifice diameter relative to that of the TPC valve.

If the fuel tank pressure does not reach a second pressure threshold by a pre-determined duration, the LRV may be adjusted to the unlatched open position. The unlatched open position may be more open than the latched open position. Further, the unlatched open position may provide a faster vapor flow rate than the latched open position. Accordingly, fuel vapors may be transferred from the fuel tank to the fuel vapor canister at the faster flow rate in the unlatched open position of the LRV, and the fuel tank pressure may attain the second pressure threshold within a shorter duration. The refueling lock may be opened after the second pressure threshold is reached in the fuel tank. Upon completion of refueling, each of the TPC valve and the LRV may be closed, and the refueling lock may be locked. Specifically, the LRV may be adjusted from the latched open position to the latched closed position via a pulse of voltage.

Thus, an example system for a hybrid-electric vehicle may include an engine, a fuel tank coupled to a fuel vapor canister via each of a first conduit and a second conduit, a tank pressure control valve coupled in the first conduit between the fuel tank and the fuel vapor canister, a latchable refueling valve coupled in the second conduit between the fuel tank and the fuel vapor canister, the latchable refueling valve including a latch and a latch guide, and a controller configured with instructions stored in non-transitory memory and executable by a processor for in response to a refueling request, opening the tank pressure control valve while maintaining the latchable refueling valve closed at a latched, closed position, and when fuel tank pressure is lower than a first pressure threshold, actuating the latchable refueling valve with a voltage pulse to a latched open position to transfer fuel vapors into the fuel vapor canister, and if fuel tank pressure is higher than a second pressure threshold after a pre-determined duration, actuating the latchable refueling valve to an unlatched open position with continuously applied voltage. The latched open position of the latchable refueling valve may enable a first flow rate of fuel vapors, and the unlatched open position of the latchable refueling valve may allow a second flow rate, the second flow rate higher than the first flow rate. The second pressure threshold may be lower than the first pressure threshold. The example system may further comprise a refueling lock, and the controller may be further configured with instructions for, when the fuel tank pressure is lower than the second pressure threshold, unlocking the refueling lock.

An example method may comprise modifying a position of a latchable refueling valve from a latched closed position to a latched open position via a first voltage pulse, adjusting the position of the latchable refueling valve from the latched open position to the latched closed position via a second voltage pulse, and adjusting the position of the latchable refueling valve to an unlatched open position via a continuously applied voltage, the unlatched open position being more open than the latched open position. Herein, a duration of the first voltage pulse may be substantially equal to a duration of the second voltage pulse, and a duration of the continuously applied voltage may be longer than each of the duration of the first voltage pulse and the duration of the second voltage pulse. The method may further comprise flowing fuel vapors from a fuel tank to a fuel vapor canister via the latchable refueling valve, the flowing occurring when the latchable refueling valve is adjusted to one of the latched open position and the unlatched open position. The position of the latchable refueling valve may be adjusted to the unlatched open position from the latched open position responsive to a fuel tank pressure remaining higher than a pressure threshold after a pre-determined duration at the latched open position. The flow of fuel vapors from the fuel tank to the fuel vapor canister may be blocked by adjusting the latchable refueling valve to the latched closed position.

In this way, the position of the LRV may be adjusted to the unlatched open position when desired. The technical effect of adjusting the LRV to the unlatched open position may include a faster depressurization of the fuel tank. Further, a waiting time for a vehicle operator prior to refueling may be reduced by adjusting the LRV to the unlatched open position. Since the LRV is actuated to its unlatched open position only when desired, power consumption of the LRV may also be diminished. As such, operating costs of the vehicle may be decreased.

In another representation, an example system may comprise a latchable, refueling valve arranged in a conduit between a fuel tank and a fuel vapor canister, wherein a position of the latchable, refueling valve may be varied between a first, latched position (e.g., latched closed) to impede flow of fuel vapors from the fuel tank to the fuel vapor canister, a second latched position (e.g., latched open position) to enable the flow of fuel vapors from the fuel tank to the fuel vapor canister at a first flow rate, and a third unlatched position allowing the flow of fuel vapors from the fuel tank to the fuel vapor canister at a second flow rate.

In yet another representation, a method for depressurizing a fuel tank may comprise adjusting a latchable valve (e.g., the LRV) from a latched closed position to a latched open position by applying a finite pulse of voltage, the latched open position allowing depressurization at a first flow rate, and responsive to a fuel tank pressure higher than a first threshold pressure after a threshold duration, adjusting the latchable valve from the latched open position to an unlatched open position by a continuous supply of voltage, the unlatched open position enabling depressurization at a second flow rate, the second flow rate higher than the first flow rate. The latchable valve may be adjusted from the latched closed position to the latched open position in response to fuel tank pressure decreasing below a second threshold pressure, the second threshold pressure attained by opening a tank pressure control valve. The tank pressure control valve may be opened responsive to each of a refueling request and fuel tank pressure higher than the second threshold pressure. The method may further comprise unlocking a refueling lock in response to fuel tank pressure decreasing below the first threshold pressure. The method may further comprise adjusting the latchable valve to the latched closed position and closing the tank pressure control valve after completion of refueling.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a latchable valve to a first, latched position via a voltage pulse, the first, latched position enabling depressurization of a fuel tank; and
responsive to a pressure in the fuel tank higher than a first pressure threshold after a pre-determined duration,
moving the latchable valve to and holding the latchable valve in a second, unlatched position with a continuously applied voltage, the unlatched position more open than the first, latched position.

2. The method of claim 1, wherein the latchable valve fluidically couples the fuel tank and a fuel vapor canister when adjusted to each of the first, latched position and the second, unlatched position, wherein fuel vapors flow from the fuel tank to the fuel vapor canister when the latchable valve is in each of the first, latched position and the second, unlatched position, wherein the continuously applied voltage is separate from and is applied after the voltage pulse, and wherein a length of the continuously applied voltage is longer than the voltage pulse.

3. The method of claim 2, wherein fuel vapors flow at a higher flow rate when the latchable valve is at the second, unlatched position relative to when the latchable valve is at the first, latched position.

4. The method of claim 3, wherein the continuously applied voltage is applied for a longer duration than the voltage pulse.

5. The method of claim 4, further comprising, unlocking a refueling lock responsive to the pressure in the fuel tank reducing below the first pressure threshold.

6. The method of claim 5, further comprising adjusting the latchable valve to a third, latched position via a voltage pulse after completion of refueling.

7. The method of claim 6, wherein the third, latched position includes fully closing the latchable valve impeding flow of fuel vapors from the fuel tank into the fuel vapor canister.

8. The method of claim 6, further comprising supplying liquid fuel from the fuel tank to an engine of a motor vehicle, wherein the motor vehicle is propelled with each of the engine and an electric motor.

9. The method of claim 1, wherein the latchable valve is adjusted to the first, latched position in response to the pressure in the fuel tank decreasing to a second pressure threshold, the second pressure threshold being higher than the first pressure threshold.

10. The method of claim 9, wherein the pressure in the fuel tank decreases to the second pressure threshold in response to opening a tank pressure control valve, the tank pressure control valve opened in response to each of a refueling request and the pressure in the fuel tank being higher than the second pressure threshold.

11. A system for a hybrid-electric vehicle, comprising:
an engine;
a fuel tank coupled to a fuel vapor canister via each of a first conduit and a second conduit;
a tank pressure control valve coupled in the first conduit between the fuel tank and the fuel vapor canister;

a latchable refueling valve coupled in the second conduit between the fuel tank and the fuel vapor canister, the latchable refueling valve including a latch and a latch guide; and a controller configured with instructions stored in non-transitory memory and executable by a processor for:

in response to a refueling request:

opening the tank pressure control valve while maintaining the latchable refueling valve closed at a latched, closed position; and when fuel tank pressure is lower than a first pressure threshold, actuating the latchable refueling valve with a voltage pulse to a latched open position to transfer fuel vapors into the fuel vapor canister; and if fuel tank pressure is higher than a second pressure threshold after a pre-determined duration, actuating the latchable refueling valve to an unlatched open position with continuously applied voltage.

12. The system of claim 11, wherein the latched open position of the latchable refueling valve enables a first flow rate of fuel vapors, and wherein the unlatched open position of the latchable refueling valve allows a second flow rate, the second flow rate higher than the first flow rate.

13. The system of claim 12, wherein the second pressure threshold is lower than the first pressure threshold.

14. The system of claim 11, further comprising a refueling lock.

15. The system of claim 14, wherein the controller is further configured with instructions for:

when the fuel tank pressure is lower than the second pressure threshold, unlocking the refueling lock.

16. A method, comprising:

modifying a position of a latchable refueling valve from a latched closed position to a latched open position via a first voltage pulse;

adjusting the position of the latchable refueling valve from the latched open position to the latched closed position via a second voltage pulse; and adjusting the position of the latchable refueling valve to and holding the latchable refueling valve in an unlatched open position via a continuously applied voltage that is separate from the first voltage pulse and the second voltage pulse, the unlatched open position being more open than the latched open position.

17. The method of claim 16, wherein a duration of the first voltage pulse is substantially equal to a duration of the second voltage pulse, wherein a duration of the continuously applied voltage is longer than each of the duration of the first voltage pulse and the duration of the second voltage pulse, and wherein the latchable refueling valve is held in the unlatched open position for a duration that is equal to the duration of the continuously applied voltage.

18. The method of claim 17, further comprising flowing fuel vapors from a fuel tank to a fuel vapor canister via the latchable refueling valve, the flowing occurring when the latchable refueling valve is adjusted to one of the latched open position and the unlatched open position.

19. The method of claim 18, wherein the position of the latchable refueling valve is adjusted to the unlatched open position from the latched open position responsive to a fuel tank pressure remaining higher than a pressure threshold after a pre-determined duration at the latched open position.

20. The method of claim 19, wherein flow of fuel vapors from the fuel tank to the fuel vapor canister is blocked by adjusting the latchable refueling valve to the latched closed position.

* * * * *